(12) United States Patent
Nomi et al.

(10) Patent No.: US 12,524,083 B2
(45) Date of Patent: Jan. 13, 2026

(54) INFORMATION PROCESSING SYSTEM

(71) Applicant: Wacom Co., Ltd., Saitama (JP)

(72) Inventors: Tsukasa Nomi, Saitama (JP); Hideki Fujimaki, Saitama (JP); Hiroaki Gotoda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/888,900

(22) Filed: Sep. 18, 2024

(65) Prior Publication Data
US 2025/0013319 A1     Jan. 9, 2025

Related U.S. Application Data

(63) Continuation of application No. PCT/JP2022/048440, filed on Dec. 28, 2022.

(30) Foreign Application Priority Data

Mar. 30, 2022    (JP) .................................. 2022-055411

(51) Int. Cl.
*G06F 3/0346*    (2013.01)
*G06F 3/01*      (2006.01)
(Continued)

(52) U.S. Cl.
CPC ............ *G06F 3/0346* (2013.01); *G06F 3/017* (2013.01); *G06F 3/03545* (2013.01);
(Continued)

(58) Field of Classification Search
CPC .. G06F 3/0346; G06F 3/0442; G06F 3/04162; G06F 3/017; G06F 3/03545; G06F 3/0383; G06F 3/046
See application file for complete search history.

(56) References Cited

U.S. PATENT DOCUMENTS 9,323,379 B2    4/2016   Aubauer et al.
9,329,703 B2    5/2016   Falkenburg et al.
(Continued)

FOREIGN PATENT DOCUMENTS

JP    2013161307 A    8/2013
JP    2016126503 A    7/2016

OTHER PUBLICATIONS

International Search Report, dated Mar. 20, 2023, for International Patent Application 1 No. PCT/JP2022/048440. (5 pages) (with English Translation).

*Primary Examiner* — Lisa S Landis
(74) *Attorney, Agent, or Firm* — Seed Intellectual Property Law Group LLP

(57) ABSTRACT

Disclosed herein is an information processing system including a position indicator, and an information processing device including a position detection sensor, in which the position indicator includes a first transmission circuit that transmits a signal to the position detection sensor, a motion sensor that outputs motion detection information, and a second transmission circuit that transmits the motion detection information to the information processing device. The information processing device includes a position detector that detects a position of the position indicator, a reception circuit that receives the motion detection information, and a processor that causes the information processing device to detect that the position indicator has moved, detect a motion pattern of the position indicator from the motion detection information received by the reception circuit, and perform the function.

19 Claims, 9 Drawing Sheets

(51) Int. Cl.
*G06F 3/0354* (2013.01)
*G06F 3/038* (2013.01)
*G06F 3/041* (2006.01)
*G06F 3/044* (2006.01)
*G06F 3/046* (2006.01)

(52) U.S. Cl.
CPC ........ *G06F 3/0383* (2013.01); *G06F 3/04162* (2019.05); *G06F 3/0442* (2019.05); *G06F 3/046* (2013.01)

(56) References Cited

U.S. PATENT DOCUMENTS 9,367,169 B2    6/2016  Tan
2020/0387240 A1* 12/2020 Munakata ............... G06F 3/046

* cited by examiner

FIG. 6

MOTION PATTERN AND FUNCTION CORRESPONDENCE TABLE

| MOTION PATTERN | | ASSIGNED FUNCTION | | | | |
|---|---|---|---|---|---|---|
| | | UPSIDE OUTSIDE AREA Us | DOWNSIDE OUTSIDE AREA Ds | LEFT OUTSIDE AREA Ls | RIGHT OUTSIDE AREA Rs | HIGHER-LEVEL OUTSIDE AREA Ss |
| TURN | | MUSIC PLAY | INTERNET CONNECTION | RETURN | PHOTOGRAPH | MEMORANDUM |
| SHAKE | | MUSIC STOP | ALBUM | FORWARD | MOVING IMAGE | PICTURE DRAWING |

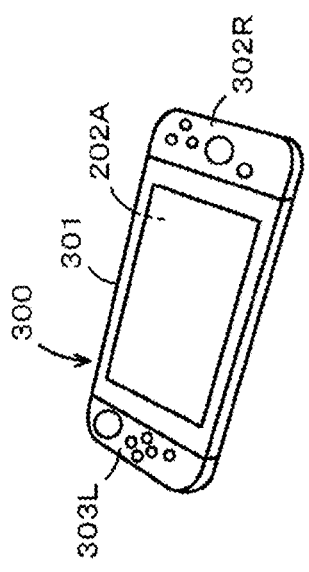
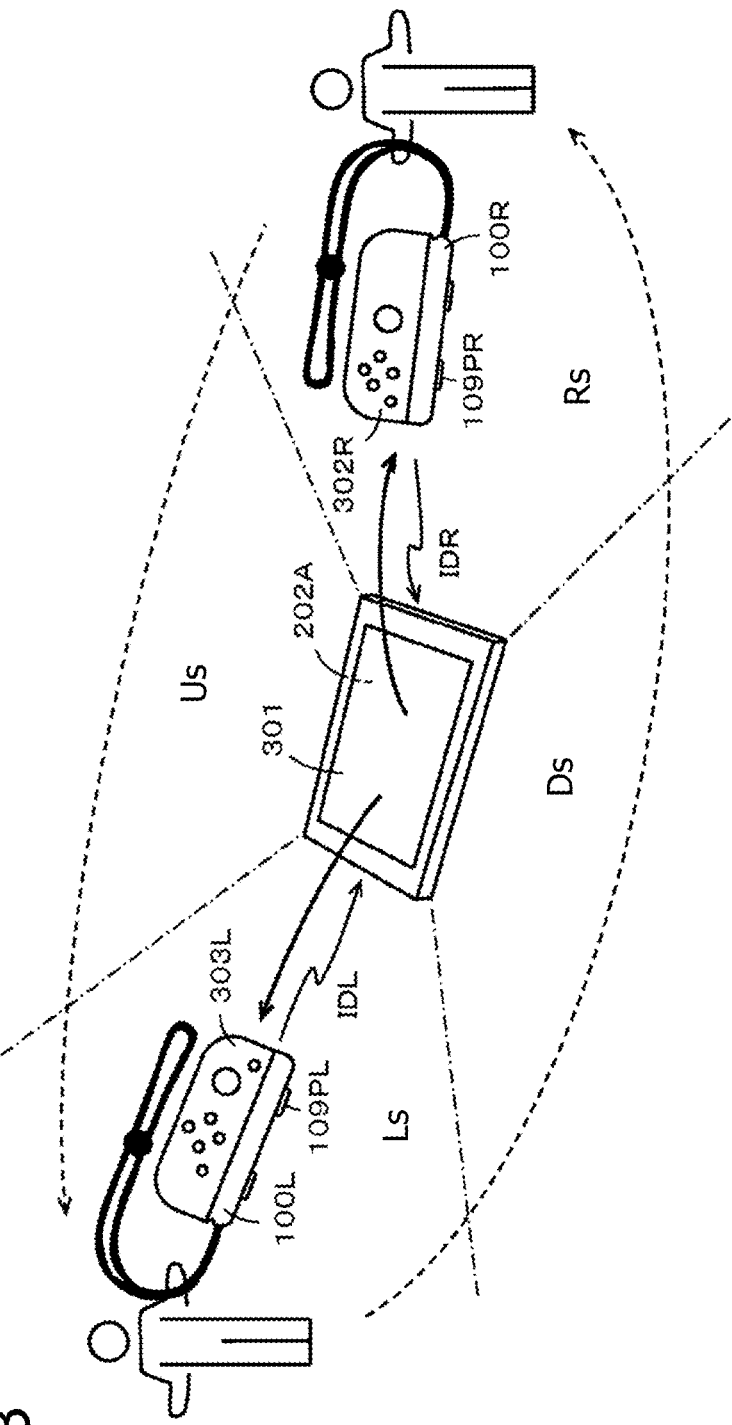
FIG. 9A
FIG. 9B

INFORMATION PROCESSING SYSTEM

BACKGROUND

Technical Field

This disclosure relates to an information processing system having an electronic pen and an information processing device including a position detection sensor for detecting a position indicated by an electronic pen.

Description of the Related Art

There is known an information processing system in which a writing input of a character, a drawn image, and the like can be made by indicating a position by an electronic pen to an information processing device including a position detection sensor. In this case, the operator executes a position indication operation in the state in which the electronic pen is brought into contact with an input surface corresponding to a position detection area of the position detection sensor of the information processing device or in the state in which the electronic pen is not in contact with the input surface but placed in an upper area in which position detection is possible (hover state). The information processing device detects the position indicated by the electronic pen and generates a character image or a drawn image as the detection result to display the generated image on a display screen. The operator executes the writing input while checking the character image or drawn image displayed on the display screen.

Recently, systems and applications that allow a drawn image displayed on a two-dimensional display screen to be subjected to a rendering expression (for example, rotation, deformation, etc.) to visually look like a three-dimensional image have come into existence. In this case, the motion (gesture) of, for example, a hand or finger of the operator is detected by using a motion sensor, and rendering expression processing is executed on the basis of the detected motion (gesture).

Furthermore, for example, U.S. Pat. No. 9,329,703 B2 discloses a technique in which a sensor that can measure the motion and orientation of an electronic pen is incorporated in or mounted on the electronic pen and a detection output of the sensor is transmitted to an information processing device to allow the information processing device to detect the motion of the electronic pen.

Moreover, user interfaces that allow both the above-described position indication input and an operation input such as a gesture have been provided (for example, refer to U.S. Pat. Nos. 9,367,169 and 9,323,379).

U.S. Pat. No. 9,367,169 discloses a touch controller configured to execute switching from a hover event detection mode to a gesture event detection mode in response to a signal from a motion sensor.

Furthermore, U.S. Pat. No. 9,323,379 discloses a controller section that alternately determines position information detected through a touch sensor-system display and position information detected through a contactless detection section.

If the technique described in the above-described U.S. Pat. No. 9,329,703 B2 is used for the above-described information processing system, when a user who grasps the electronic pen makes a gesture such as drawing a circle by the electronic pen in a space or shaking the electronic pen, motion detection information of the sensor incorporated in or mounted on the electronic pen is received by the information processing device and the gesture can be detected. The rendering expression processing can be executed on the basis of the detected motion (gesture).

Moreover, using the technique disclosed in U.S. Pat. No. 9,367,169 or U.S. Pat. No. 9,323,379 enables the information processing device to execute both processing of detecting the motion (gesture) of the electronic pen and position detection processing of the position indicated by the electronic pen and execute various kinds of processing such as the rendering expression processing.

However, in the method of switching in response to a signal from the motion sensor as in U.S. Pat. No. 9,367,169, there is a problem that the tilt of the device needs to be changed every time for the switching.

Furthermore, in the case of U.S. Pat. No. 9,323,379, there is a problem that switching between the touch sensor-system display and the contactless detection section is executed in a time-sharing manner and the time resolution of each of them lowers.

Moreover, as a tablet-type information terminal, one having a wide variety of functions exists. Conventionally, in this kind of terminal, in the case in which these functions are selected by operation buttons or the terminal includes a position detection sensor, these functions are selected and activated through selection from a menu of these functions on a display screen or display of icons corresponding to the respective functions on the display screen and selection of the icon. Thus, the operation is cumbersome.

BRIEF SUMMARY

This disclosure provides an information processing system that can solve the above problems.

In order to solve the above-described problem, there is provided an information processing system including a position indicator and an information processing device including a position detection sensor. The position indicator includes a first transmission circuit that, in operation, transmits a signal to the position detection sensor of the information processing device, a motion sensor that, in operation, outputs motion detection information of the position indicator, and a second transmission circuit that, in operation, transmits the motion detection information of the position indicator to the information processing device. The information processing device includes a position detector that, in operation, detects a position of the position indicator in a position detection area of the position detection sensor based on the signal transmitted by the first transmission circuit of the position indicator, a reception circuit that, in operation, receives the motion detection information of the position indicator from the second transmission circuit of the position indicator, a processor, and a memory storing instructions that, when executed by the processor, cause the information processing device to: detect that the position indicator has moved from inside of the position detection area of the position detection sensor to outside of the position detection area, detect a motion pattern of the position indicator from the motion detection information received by the reception circuit based on detection of movement of the position indicator to outside of the position detection area, recognize a function of the information processing device assigned to the motion pattern of the position indicator, and perform the function.

In the information processing system with the above-described configuration, when a user has performed an operation to move the position indicator from inside of the position detection area of the position detection sensor to outside thereof, the outward movement by this operation is detected. Thereupon, the motion pattern (gesture) of the position indicator to which the function is assigned in advance is monitored and detected based on the detection of the movement of the position indicator to outside of the position detection area. Then, when the motion pattern of the position indicator to which the function is assigned in advance is recognized, the function assigned to the detected motion pattern is performed.

Therefore, according to the information processing system with the above-described configuration, the user can cause the function assigned corresponding to the predetermined motion pattern to be performed by the information processing device by only performing an operation to move the position indicator to outside of the position detection area of the position detection sensor and making the predetermined motion pattern by the position indicator outside of the position detection area.

BRIEF DESCRIPTION OF THE SEVERAL VIEWS OF THE DRAWINGS

FIG. 6 is a diagram used for explaining the part of the example of the information processing device that configures the embodiment of the information processing system according to this disclosure;

FIGS. 9A and 9B are diagrams for explaining another embodiment of the information processing system according to this disclosure.

DETAILED DESCRIPTION OF THE PREFERRED EMBODIMENTS

Figure 1:
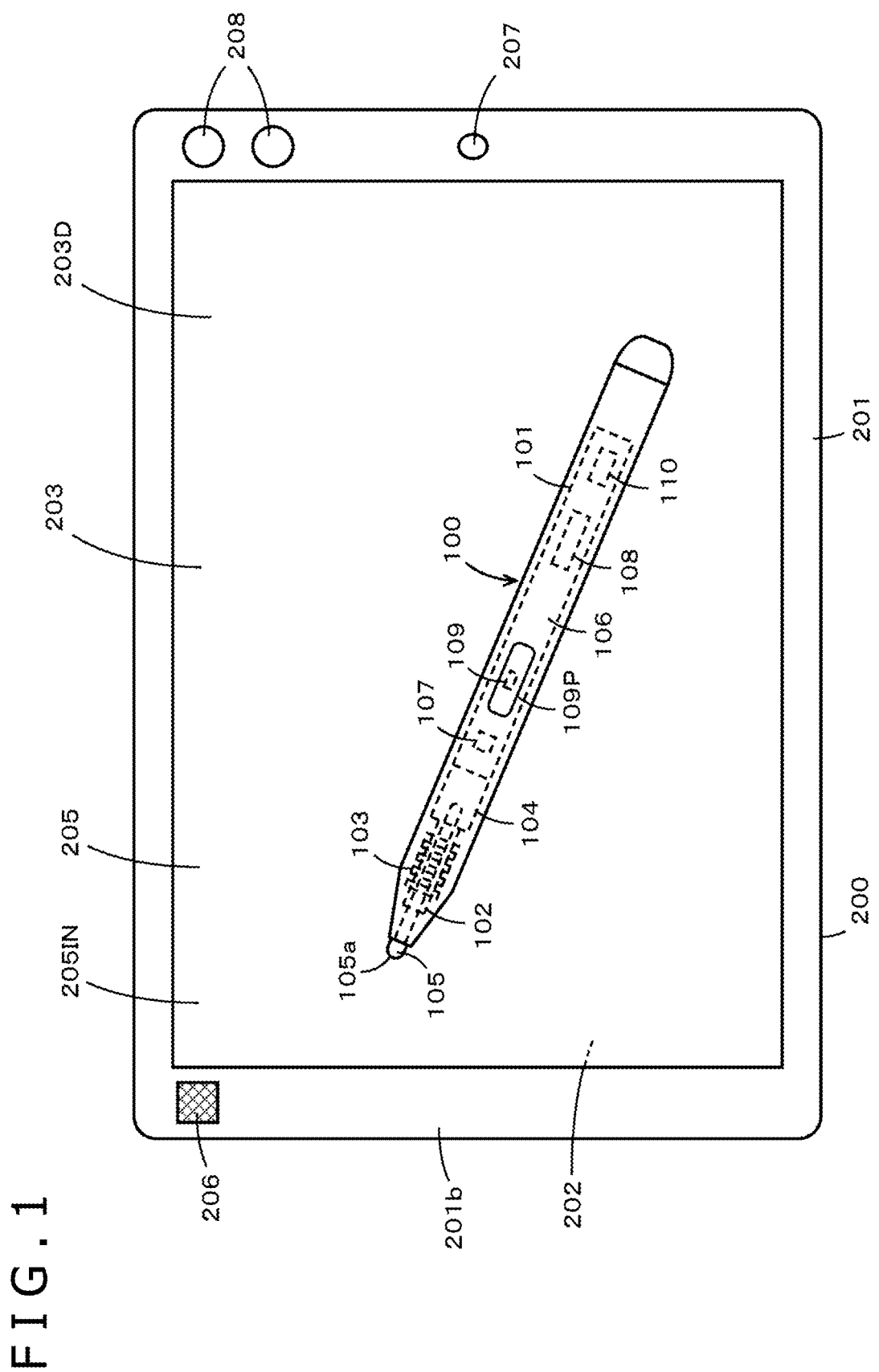
FIG. 1 is a diagram for explaining the outline of an embodiment of the information processing system according to this disclosure.

An embodiment of the information processing system according to this disclosure will be described with reference to the drawings. FIG. 1 illustrates an example of the appearance of the information processing system of the embodiment. The information processing system of this embodiment includes an electronic pen 100 as an example of a position indicator and a tablet-type information terminal 200 as an example of an information processing device.

In this example, the tablet-type information terminal 200 includes, in a flattened rectangular casing 201, a position detector including a position detection sensor 202 of, in this example, an electromagnetic induction system and a function execution part as a part that executes various functions to be described later. In addition, the tablet-type information terminal 200 includes a display device 203 in this example. The position detection sensor 202 of the position detector is disposed on the back side of a display screen 203D of the display device 203 in the state in which a display area of the display device 203 and a position detection area of the position detection sensor 202 overlap with each other.

Figure 2:
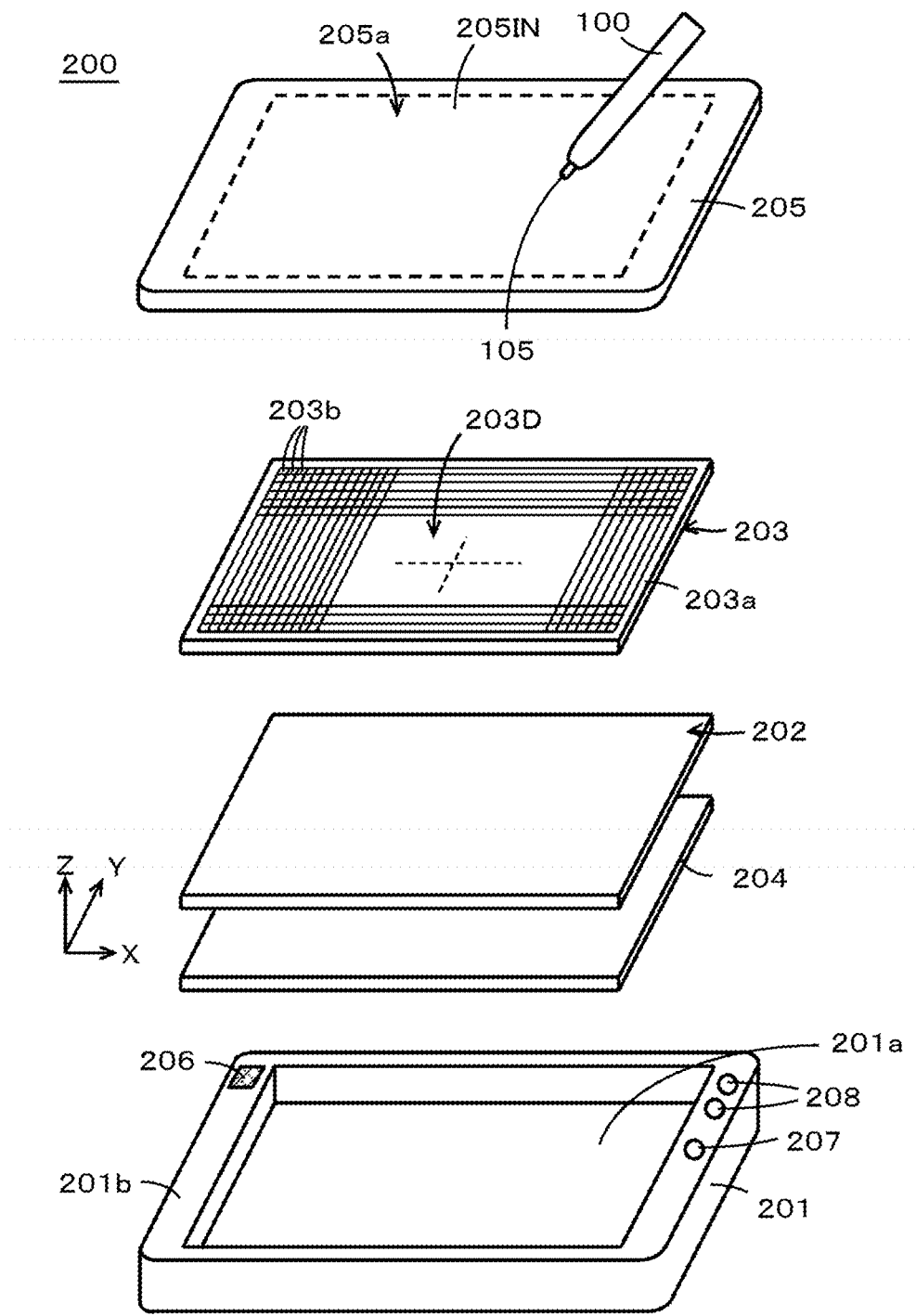
FIG. 2 is an exploded perspective view for explaining the configuration of one example of an information processing device that configures the embodiment of the information processing system according to this disclosure.

FIG. 2 is an exploded configuration diagram illustrating a configuration example of the tablet-type information terminal 200. In the example of this FIG. 2, the tablet-type information terminal 200 is formed by housing the display device 203, the position detection sensor 202 of the electromagnetic induction system, and a circuit board 204 in a housing recess part 201a of the casing 201 and closing an upper part of the housing recess part 201a of the casing 201 by a planar member 205.

The display device 203 is formed of a flat display such as a liquid crystal display or organic electroluminescence (EL) display. On a display substrate 203a, a large number of display pixels 203b are arranged in an X-axis direction (horizontal direction) and a large number of display pixels 203b are arranged in a Y-axis direction (vertical direction) orthogonal to the X-axis direction. This forms the display screen 203D.

The position detection sensor 202 is formed by arranging a plurality of loop coils in each of the X-axis direction and the Y-axis direction. This position detection sensor 202 is disposed on the back surface side of the display screen 203D of the display device 203 in the state in which the position detection area of the position detection sensor 202 and the display area of the display device 203 just overlap. That is, in this example, the position detection area of the position detection sensor 202 and the display area of the display screen 203D of the display device 203 are made to have an almost equal size, and the arrangement relation in which both of the areas overlap is made.

The position detector connected to the position detection sensor 202 is formed on the circuit board 204. The circuit board 204 and the position detection sensor 202 are connected by a flexible cable, for example.

Furthermore, the following elements are also formed on the circuit board 204 as described later: a wireless communication part for wireless connection to the electronic pen 100 and a reception processing circuit for information received by the wireless communication part, the function execution part for executing predetermined functions that the tablet-type information terminal 200 has, a computer for controlling the position detector and the function execution part, a display control circuit of the display device 203, other electronic parts, a copper foil wiring pattern, and the like.

Note that the tablet-type information terminal 200 has a music play function, a camera function, and the like as examples of the predetermined functions. Thus, as illustrated in FIGS. 1 and 2, a speaker 206 and a camera (imaging element) 207 are disposed in a ring-shaped frame part 201b around the housing recess part 201a of the casing 201 and are electrically connected to the function execution part of the circuit board 204. Moreover, operation buttons 208 and the like electrically connected to the circuit board 204 are also disposed in the ring-shaped frame part 201*b* of the casing 201.

The planar member 205 is composed of, for example, a transparent material such as glass or a resin, and the side of one surface 205*a* thereof is employed as the input surface side when position indication is executed by the electronic pen 100. Furthermore, the display device 203 and the position detection sensor 202 are disposed on the side of the surface on the opposite side to the one surface 205*a* in this planar member 205.

In this example, the planar member 205 has a shape slightly larger than the position detection area of the position detection sensor 202. Moreover, in the planar member 205 in FIG. 2, an area indicated by being surrounded by a dotted line is an area corresponding to the position detection area of the position detection sensor 202. This area is employed as an area of an input surface 205IN that accepts position indication by the electronic pen 100.

In the electronic pen 100 of the electromagnetic induction system in this example, as illustrated in FIG. 1, a coil 103 wound around a magnetic core, for example, a ferrite core 102, is disposed on the pen tip side of a hollow part of a tubular casing 101. A writing pressure detector 104 is disposed on the opposite side to the pen tip side of the ferrite core 102 in the axial center direction of the hollow part of the casing 101. A bar-shaped core body 105 is inserted into a through-hole (illustration is omitted) made in the ferrite core 102 from an opening on the pen tip side in the casing 101 and is fitted and attached to this writing pressure detector 104. A tip part of the core body 105 protrudes to the external from the opening on the pen tip side in the casing.

A circuit board 106 is disposed on the opposite side to the pen tip side of the writing pressure detector 104 in the axial center direction of the hollow part of the casing 101. A capacitor 107 that is connected in parallel to the coil 103 wound around the ferrite core 102 and forms a resonant circuit is disposed on this circuit board 106.

This resonant circuit is what forms an interaction part for executing interaction of a signal with the position detection sensor 202. In the electronic pen 100 of the electromagnetic induction system in this example, the resonant circuit operates to receive a signal sent from the position detection sensor 202 by resonance and transmit a return signal thereof to the position detection sensor 202. A transmission function part of the return signal from the resonant circuit as this interaction part configures the first transmission circuit that transmits a signal to the position detection sensor 202.

Furthermore, in this example, the writing pressure detector 104 is made into a configuration of a capacitance-variable capacitor that detects the pressure (writing pressure) applied to the tip of the core body 105 as change in the capacitance. As this kind of writing pressure detector, the following well-known configurations can be used: a configuration in which the capacitance changes due to change in the contact area between a dielectric and an electrically-conductive elastic member according to the applied pressure (for example, refer to the patent document: Japanese Patent Laid-open No. 2016-126503), a configuration formed of a semiconductor device in which the distance between two electrodes opposed to each other with the interposition of an air layer as a dielectric changes according to the applied pressure (for example, refer to the patent document: Japanese Patent Laid-open No. 2013-161307), and the like. Here, detailed description thereof is omitted.

In this example, the capacitance-variable capacitor formed of the writing pressure detector 104 is connected in parallel to the coil 103 and forms part of the resonant circuit. As described later, the capacitance-variable capacitor is configured to transmit the writing pressure detected by the writing pressure detector 104 to the side of the position detection sensor 202 as change in the resonant frequency of the resonant circuit.

Moreover, in this example, a motion sensor 108 that detects the motion of the electronic pen 100 is disposed on the circuit board 106 as illustrated in FIG. 1. As this motion sensor 108, in this example, a gyro sensor that detects the motion of the electronic pen 100 as change in the angular velocity is used. In this case, in this example, a multi-axis gyro sensor of three or more axes is used so that the motion of the electronic pen 100 can be detected with high accuracy.

Furthermore, a side switch 109 turned on and off by press operation from the external is disposed on the circuit board 106 in this example. This side switch 109 is turned on/off through operation of an operation part 109P for the side switch disposed at a predetermined position on the outer circumferential side surface of the casing 101 of the electronic pen 100 of this example.

Moreover, in the electronic pen 100 of this example, disposed on the circuit board 106 is a wireless communication part 110 for sending motion detection information detected by the motion sensor 108 and side switch information indicating the on/off-state of the side switch 109 to the side of the tablet-type information terminal 200 by wireless communication. In the tablet-type information terminal 200, functions corresponding to press-down operation of the operation part 109P for the side switch in the electronic pen 100 are assigned. In this embodiment, press-down operation of the operation part 109P for the side switch for a short time is defined as an instruction input corresponding to click operation of a mouse as a pointing device. In addition, long press operation is assigned to transition trigger operation to an assigned function execution mode to be described later in an outside area to be described later.

Note that, although illustration is omitted in FIG. 1, a control circuit formed of a microprocessor is disposed on the circuit board 106, and the configuration is made in such a manner that operation of the electronic pen 100 is controlled by this control circuit.

Outline of Operation in Information Processing System in this Embodiment

Similarly to existing techniques, the tablet-type information terminal 200 of the information processing system of this embodiment has a position indication detection mode in which, when an indication input by the electronic pen 100 is made in the position detection area of the position detection sensor 202, the indicated position is detected by the position detector and processing corresponding to the detected indicated position is executed.

In addition to the above-described position indication detection mode, the tablet-type information terminal 200 of the information processing system of this embodiment has the assigned function execution mode in which a function assigned to a predetermined motion pattern in advance is executed in the case in which a user who holds the electronic pen 100 causes the electronic pen 100 to make the predetermined motion pattern in an area outside the position detection area of the position detection sensor 202. Furthermore, the tablet-type information terminal 200 of the information processing system of this embodiment has a non-position indication detection mode as a mode that is not the assigned function execution mode even when the electronic pen 100 is located outside the position detection area of the position detection sensor.

Moreover, in this embodiment, operation of moving the electronic pen 100 from the position detection area of the position detection sensor 202 to the outside thereof by the user in the position indication detection mode is defined as transition operation for a transition to the assigned function execution mode, and the tablet-type information terminal 200 is configured to be capable of detecting this transition operation.

Furthermore, in this embodiment, in order to allow ensured detection of the transition operation for a transition to the assigned function execution mode, the user moves the electronic pen 100 to the outside of the position detection area while executing a long press of the operation part 109P for the side switch. Note that the operation with the long press of the operation part 109P for the side switch is not indispensable and the electronic pen 100 may be moved to the outside of the position detection area without operation of the operation part 109P for the side switch.

When the assigned function execution mode is started, the tablet-type information terminal 200 of this embodiment executes detection operation of a motion pattern of the electronic pen 100 defined in advance based on received motion detection information from the motion sensor 108 of the electronic pen 100. When detecting the motion pattern, the tablet-type information terminal 200 executes a function associated with and assigned to the detected motion pattern.

Figure 3A:
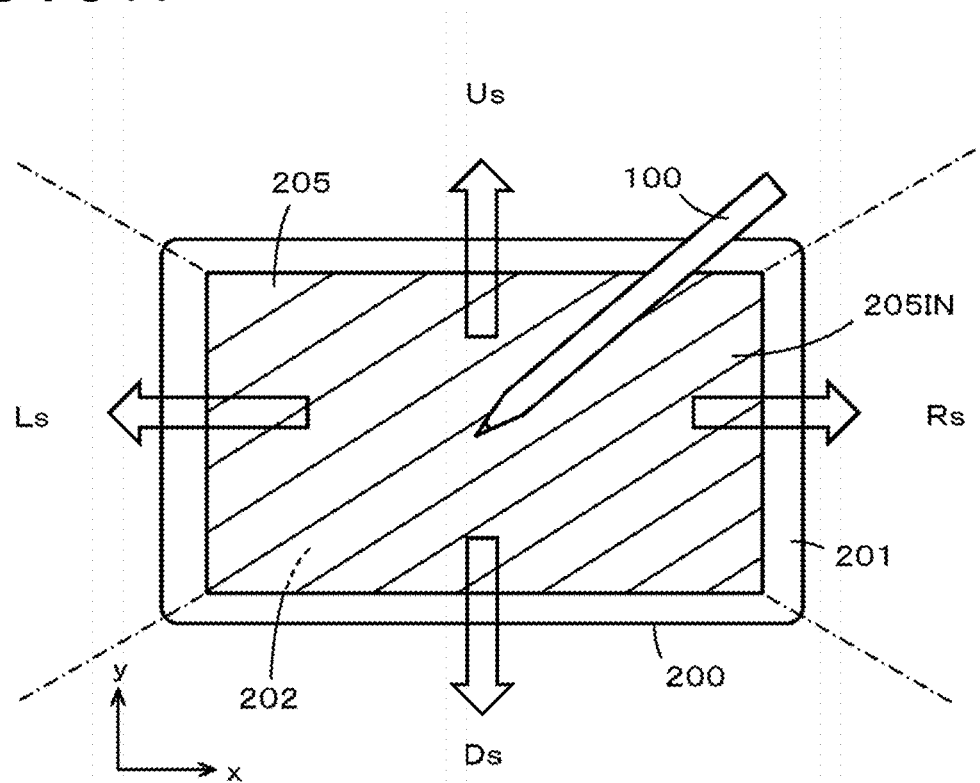
FIGS. 3A and 3B are diagrams used for explaining the configuration of the major part of the embodiment of the information processing system according to this disclosure.
Figure 3B:
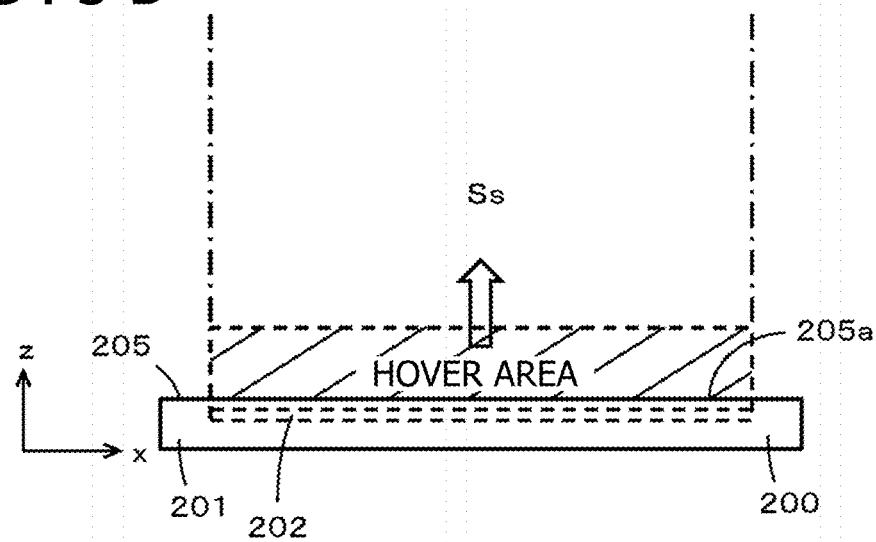

With reference to FIGS. 3A and 3B, description will be made about the outline of operation of the position indication detection mode and the assigned function execution mode in the information processing system of this embodiment.

FIGS. 3A and 3B are diagrams for explaining the position detection area of the position detection sensor 202 of the tablet-type information terminal 200 and outside areas of the position detection area. FIG. 3A is a top view of the tablet-type information terminal 200 as viewed from the upper side in the direction orthogonal to the planar member 205. FIG. 3B is a side view of the tablet-type information terminal 200.

In this embodiment, the position detection area of the position detection sensor 202 of the tablet-type information terminal 200 is a quadrangular area in a range indicated by oblique lines in FIG. 3A in the input surface 205IN. In this embodiment, the position detection area of the position detection sensor 202 includes not only the inside of the plane of this quadrangular area but also what is called a hover area that exists above the quadrangular area in the input surface 205IN as illustrated by oblique lines in FIG. 3B and in which the position detection sensor 202 and the electronic pen 100 can execute interaction of a signal.

The outside areas of the position detection area of the position detection sensor 202 are areas in which the position detection sensor 202 and the electronic pen 100 are incapable of interaction of a signal. As illustrated in FIG. 3A, the outside areas include a left outside area Ls and a right outside area Rs existing in the horizontal direction (x-axis direction) of the quadrangular area of the position detection area of the input surface 205IN and an upside outside area Us and a downside outside area Ds existing in the vertical direction (up-down direction: y-axis direction) of the quadrangular area of the position detection area of the input surface 205IN. As illustrated in FIG. 3B, the outside areas include a higher-level outside area Ss that exists above the hover area in the direction orthogonal to the input surface 205IN (z-axis direction) and in which the position detection sensor 202 and the electronic pen 100 are incapable of interaction of a signal. In this case, each of the left outside area Ls, the right outside area Rs, the upside outside area Us, and the downside outside area Ds includes also a space in the z-axis direction.

Position of Electronic Pen 100 Exists in Position Detection Area of Position Detection Sensor: Position Indication Detection Mode In the tablet-type information terminal 200 of this embodiment, when the electronic pen 100 is being used in the position detection area of the position detection sensor 202, the position indication detection mode is set, and the position detector of the tablet-type information terminal 200 detects a position indicated by a tip part 105a of the core body 105 of the electronic pen 100. Then, according to the detected indicated position, the tablet-type information terminal 200 executes processing of displaying the writing locus on the display screen or executing the function indicated by the electronic pen 100 to display the contents of the execution or the execution result on the display screen.

Moreover, also when the electronic pen 100 is being used in the position detection area of the position detection sensor 202, the tablet-type information terminal 200 of this embodiment monitors the motion detection information that is detected by the motion sensor 108 of the electronic pen 100 and is acquired by a motion detection information acquisition part 220, and detects motion including the tilt and the like and change in the posture and the like regarding the electronic pen 100. The tablet-type information terminal 200 uses the motion detection result for processing, specifically, for example, reflects the motion detection result in the writing locus or a drawn image on the display screen.

Furthermore, in the information processing system of this embodiment, when the user has moved the electronic pen 100 to the higher-level outside area Ss existing above the hover area and outside the position detection area in the position indication detection mode, the movement amount (Δx, Δy, Δz) with respect to information on the indicated position detected last in the hover area is detected from the motion detection information received from the motion sensor 108 of the electronic pen 100. Then, the detected movement amount is added to the indicated position detected last. Thereby, the position indicated by the electronic pen 100 in the higher-level outside area Ss is detected.

Moreover, the tablet-type information terminal 200 repeats the process of detecting the movement amount (Δx, Δy, Δz) with respect to the indicated position detected previously from the motion detection information further received newly and adding the detected movement amount to the indicated position detected previously. This can detect the position indicated by the electronic pen 100 in the higher-level outside area Ss. The tablet-type information terminal 200 can execute processing of reflecting the detection result of the position indicated by the electronic pen 100 in this higher-level outside area Ss in displayed information on the display screen, or the like.

Due to this, the information processing system of this embodiment is configured to allow the position indicated by the pen tip of the electronic pen 100 to be detected even when the pen tip of the electronic pen 100 is moved to the outside of the hover area in the position indication detection mode. Thus, there is an advantage that the user is allowed to indicate a position by the electronic pen 100 above the position detection area without caring about the height range of the hover area.

Note that, in the position indication detection mode, not only in the higher-level outside area Ss but also in the other outside areas, the position of the electronic pen 100 in the outside area may be detected by using the motion detection information received from the motion sensor 108 of the electronic pen 100 similarly to the above description.

Position of Electronic Pen 100 Exists Outside Position Detection Area of Position Detection Sensor: Assigned Function Execution Mode Next, operation in the assigned function execution mode will be described. In this embodiment, a transition from the position indication detection mode to the assigned function execution mode can be made by moving the electronic pen 100 to an area outside the position detection area of the position detection sensor of the tablet-type information terminal 200. Furthermore, in the assigned function execution mode, by causing the electronic pen 100 to make a predetermined motion pattern in an area outside the position detection area, the function assigned to the motion pattern can be specified and executed.

Incidentally, the number of motion patterns of the electronic pen 100 that can be detected by the tablet-type information terminal 200 is generally a limited number, although depending also on the accuracy of the motion sensor incorporated in or mounted on the electronic pen 100. Thus, the number of functions that can be specified by the motion pattern of the electronic pen 100 in the outside area of the position detection area of the position detection sensor is also limited. In this embodiment, the area outside the position detection area of the position detection sensor is set to be divided into a plurality of areas in advance, and the function assigned corresponding to the motion pattern is changed for each of the respective outside areas arising from this division setting. Thereby, the configuration is made in such a manner that the functions that can be ordered can be effectively increased with a small number of motion patterns.

Specifically, in this embodiment, the outside area of the position detection area of the position detection sensor is divided into five areas, the above-described left outside area Ls, right outside area Rs, upside outside area Us, downside outside area Ds, and higher-level outside area Ss, and the function associated with the detected motion pattern of the electronic pen 100 is made different for each area.

Moreover, in this embodiment, in detection of the movement of the electronic pen 100 from the inside of the position detection area to the outside area as start operation for starting the assigned function execution mode, not only the detection of the movement from the inside of the position detection area to the outside area but also detection of which of the above-described five areas the electronic pen 100 has moved to is executed.

Description will be made about the way of the detection of the movement of the electronic pen 100 from the inside of the position detection area of the position detection sensor to the outside area of the position detection area and the detection of which of the five outside areas the electronic pen 100 has moved to.

Detection of Movement from Inside of Position Detection Area of Position Detection Sensor to Outside Area The tablet-type information terminal 200 detects that the electronic pen 100 has moved from the inside of the position detection area of the position detection sensor 202 to the outside area on the basis of a shift from a state in which the position of the electronic pen 100 exists in the position detection area of the position detection sensor 202 in which interaction of a signal between the electronic pen 100 and the position detection sensor 202 is possible and the position indicated by the electronic pen can be detected to a state in which interaction of a signal between the electronic pen 100 and the position detection sensor 202 is impossible and it is impossible to detect the position indicated by the electronic pen. As examples of the specific detection method, the following two methods exist in this embodiment.

First Method

The tablet-type information terminal 200 detects that the electronic pen 100 has moved from the inside of the position detection area of the position detection sensor 202 to the outside area by detecting a shift from the state in which the received signal level of a signal from the electronic pen 100 received through the position detection sensor 202 is equal to or higher than a predetermined threshold to the state in which the received signal level is equal to or lower than the predetermined threshold.

Second Method

The tablet-type information terminal 200 detects that the electronic pen 100 has moved from the inside of the position detection area of the position detection sensor 202 to the outside area by detecting a shift from the state in which the received signal level of a signal from the electronic pen 100 received through the position detection sensor 202 is equal to or higher than the predetermined threshold and interaction of a signal between the position detection sensor 202 and the electronic pen is possible and the position detection coordinates of the position indicated by the electronic pen 100 are obtained to the state in which the received signal level is equal to or lower than the predetermined threshold and thus interaction of a signal between the position detection sensor 202 and the electronic pen is impossible and the position detection coordinates of the position indicated by the electronic pen 100 in the position detection area of the position detection sensor 202 are not obtained.

Furthermore, as described above, in this embodiment, the tablet-type information terminal 200 executes switching from the position indication detection mode to the assigned function execution mode when detecting that the electronic pen 100 has moved from the inside of the position detection area of the position detection sensor 202 to the outside area with long press operation of the operation part 109P for the side switch.

In this case, as described above, the tablet-type information terminal 200 stores the position indicated by the electronic pen 100 immediately before it becomes impossible to detect the indicated position, and executes processing of adding the movement amount calculated by using the motion detection information of the motion sensor 108 received from the electronic pen 100 to the stored indicated position. Thereby, the tablet-type information terminal 200 detects the position of the electronic pen 100 in the relevant outside area to detect the position of the electronic pen 100 in the outside area of the position detection area of the position detection sensor 202.

Moreover, the tablet-type information terminal 200 of this embodiment is configured to return from the assigned function execution mode to the position indication detection mode when the state in which the position of the electronic pen 100 can be detected in the position detection area of the position detection sensor 202 has been made.

Detection of which of a Plurality of Outside Areas Electronic Pen has Moved to

First Method

A first method is a method in which the movement direction of the electronic pen 100 is detected and which outside area the electronic pen 100 has moved to is detected (estimated) from the detected movement direction. As the detection method of the movement direction in this case, either of the following methods can be used.

One of the methods is a method in which, to which outside area the electronic pen 100 has moved is detected by detecting which direction of the above-described upside, left, right, downside, and higher-level directions from the position detection area of the position detection sensor 202 the electronic pen 100 has moved in by using the received motion detection information of the motion sensor 108 of the electronic pen 100, because the tablet-type information terminal 200 of this embodiment can always receive this motion detection information.

The other is a method in which, in which direction of the upside, left, right, downside, and higher-level directions the electronic pen 100 has moved in the position detection area is detected from temporal change in the locus of the position indicated by the electronic pen 100 detected by the position detector and which outside area the electronic pen 100 has move to is detected as the destination in the detected direction.

The above-described two detection methods of the movement direction may be used in combination to detect which direction of the upside, left, right, downside, and higher-level directions the electronic pen 100 has moved in, in the position detection area of the position detection sensor 202.

Second Method

A second method is a method in which detection of the movement direction of the electronic pen 100 is not required. The position detection area of the position detection sensor 202 of the tablet-type information terminal 200 of the information processing system of this embodiment has a rectangular parallelepiped shape as illustrated in FIGS. 3A and 3B. Each of the left outside area Ls, the right outside area Rs, the upside outside area Us, and the downside outside area Ds is in contact with any side surface of the position detection area with the rectangular parallelepiped shape. In addition, the higher-level outside area Ss is in contact with the upper surface of the position detection area with the rectangular parallelepiped shape.

Thus, in the tablet-type information terminal 200, which of the outside areas the electronic pen 100 has moved to is detected on the basis of which of the outside areas is in contact with the surface, in the position detection area with the rectangular parallelepiped shape, including the position of the electronic pen 100 detected immediately before it becomes impossible to detect the position of the electronic pen 100 by the position detector. For example, when the position of the electronic pen 100 detected immediately before it becomes impossible to detect the position of the electronic pen 100 by the position detector is a position in the left side surface of the position detection area with the rectangular parallelepiped shape, it is detected that the electronic pen 100 has moved to the left outside area Ls. Furthermore, when the position of the electronic pen 100 is a position in the upper surface of the position detection area with the rectangular parallelepiped shape (upper surface of the hover area), it is detected that the electronic pen 100 has moved to the higher-level outside area Ss.

Note that, in the case in which the higher-level outside area Ss is not used, it is possible to make the state in which each of the left outside area Ls, the right outside area Rs, the upside outside area Us, and the downside outside area Ds is in contact with a respective one of the sides of the quadrangular position detection area of the position detection sensor 202. Which of the outside areas the electronic pen 100 has moved to can be detected on the basis of which of the outside areas is in contact with the side, in the quadrangular position detection area, including the position of the electronic pen 100 detected immediately before it becomes impossible to detect the position of the electronic pen 100 by the position detector.

Note that, although the planar shape of the position detection area of the position detection sensor 202 is a quadrangle in this embodiment, the planar shape of the position detection area may be a triangle or a polygonal shape with five or more corners. When including the hover area, the position detection area may have a polyhedral shape. Furthermore, similarly to the above description, what are in contact with the outside areas are surfaces in the case of the position detection area with the polyhedral shape and are sides in the case of the position detection area with the planar polygonal shape. Moreover, also when the shape of the position detection area of the position detection sensor 202 is a circle or circular column shape, outside areas can be set to be in contact with ranges of areas in predetermined angle ranges different from each other in the circumferential direction. Also in this case, which of the plurality of outside areas the electronic pen 100 has moved to can be detected on the basis of which arc range includes the position of the electronic pen 100 detected immediately before it becomes impossible to detect the position of the electronic pen 100 by the position detector.

Detection of Movement to any of a Plurality of Outside Areas after Movement to Outside of Position Detection Area In the case in which execution of a function in another outside area is desired after the electronic pen 100 has been moved to one outside area of the position detection area of the position detection sensor 202 and been caused to make a predetermined motion pattern in the outside area to execute a predetermined function, it suffices to once return the electronic pen 100 to the inside of the position detection area of the position detection sensor 202 and then move the electronic pen 100 to the outside area as the target in the above-described manner. However, this requires operation of once returning the electronic pen 100 to the inside of the position detection area of the position detection sensor 202, which is troublesome for the user.

Thus, in the tablet-type information terminal 200 of this embodiment, regarding the position of the electronic pen 100 in the outside area of the position detection area of the position detection sensor 202, the indicated position coordinates of the electronic pen 100 immediately before it becomes impossible to detect the indicated position are stored regarding not only the higher-level outside area Ss of the hover area but also all outside areas including the left outside area Ls, the right outside area Rs, the upside outside area Us, and the downside outside area Ds also as described above. In addition, the movement amount ($\Delta x$, $\Delta y$, $\Delta z$) in the outside area with respect to the stored indicated position coordinates is detected from the motion detection information received from the motion sensor 108 of the electronic pen 100 and the detected movement amount is added to the stored indicated position coordinates. Thereby, the indicated position coordinates of the electronic pen 100 in the higher-level outside area Ss are detected.

Therefore, in the tablet-type information terminal 200 of this embodiment, after once it is detected that the electronic pen 100 has moved to the outside area from the inside of the position detection area of the position detection sensor 202, when the electronic pen 100 is moved to another outside area by moving the electronic pen outside the position detection area of the position detection sensor 202 without movement to return the electronic pen 100 to the inside of the position detection area of the position detection sensor 202, which outside area the outside area after the movement is can be recognized.

Because the configuration is made as above, in the information processing system of this embodiment, the user can make a transition from the position indication detection mode to the assigned function execution mode by executing operation to move the electronic pen 100 from the inside of the position detection area of the position detection sensor 202 to the outside area of the position detection area in which interaction of a signal with the position detection sensor 202 is impossible, with the operation part 109P for the side switch set to a long-pressed state. Furthermore, in the assigned function execution mode, by executing operation to cause the electronic pen 100 to make a predetermined motion pattern, the function according to the motion pattern can be executed. Moreover, in this embodiment, the area outside the position detection area of the position detection sensor 202 is divided into the plurality of outside areas. In addition, the function associated with and assigned to the motion pattern in each outside area differs. Thus, the user moves the electronic pen 100 to the outside area to which the function desired to be executed is assigned, and makes the motion pattern associated with the function desired to be executed by the electronic pen 100. This allows execution of this function. That is, execution of the function desired by the user is enabled by comparatively simple operation.

Electronic Circuit Configuration Example of Electronic Pen 100 and Tablet-Type Information Terminal 200

Figure 4:
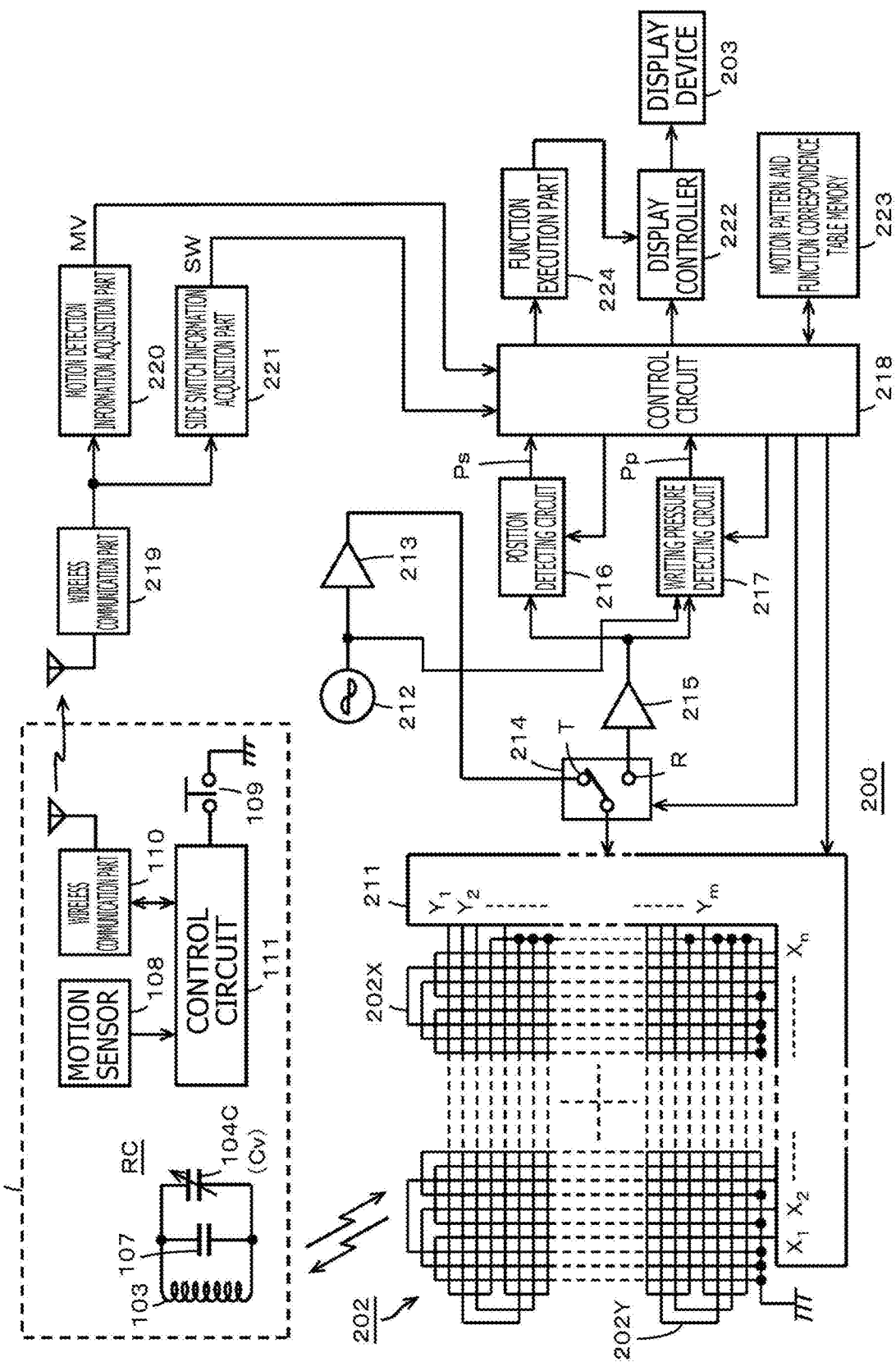
FIG. 4 is a diagram illustrating an electrical configuration example of the one example of the information processing device and an example of a position indicator that configure the embodiment of the information processing system according to this disclosure.

FIG. 4 is a diagram illustrating an electrical configuration example of the electronic pen 100 and the tablet-type information terminal 200 that form the information processing system of this embodiment.

As described above, the electronic pen 100 includes a resonant circuit RC formed by connecting the coil 103, the capacitor 107, and a variable-capacitance capacitor 104C formed of the writing pressure detector 104 in parallel. This resonant circuit RC is what executes interaction of a signal with the position detection sensor 202, and configures an example of the first transmission circuit.

In this embodiment, the electronic pen 100 includes a control circuit 111 formed of a microprocessor, for example. The motion sensor 108, the side switch 109, and the wireless communication part 110 are connected to this control circuit 111. As described above, the motion sensor 108 includes a multi-axis gyro sensor of three or more axes in this example. Furthermore, the wireless communication part 110 includes a short-distance wireless communication device of the Bluetooth (registered trademark) standard in this example. The wireless communication part 110 configures an example of the second transmission circuit.

Moreover, the control circuit 111 transmits the motion detection information of the electronic pen 100 detected by the motion sensor 108 and the side switch information indicating the on/off-state of the side switch 109 to the tablet-type information terminal 200 through the wireless communication part 110.

Meanwhile, the tablet-type information terminal 200 is provided with the position detection sensor 202, a selection circuit 211, an oscillator 212, a current driver 213, a switching connection circuit 214, a reception amplifier 215, a position detecting circuit 216, a writing pressure detecting circuit 217, a control circuit 218, a wireless communication part 219, the motion detection information acquisition part 220, a side switch information acquisition part 221, a display controller 222, a motion pattern and function correspondence table memory 223, a function execution part 224, and the display device 203.

The control circuit 218 includes a microprocessor and controls operation of the whole of the tablet-type information terminal 200. Specifically, the control circuit 218 executes control of selection of a loop coil of the position detection sensor 202 in the selection circuit 211 and switching of the switching connection circuit 214, control of processing timings in the position detecting circuit 216 and the writing pressure detecting circuit 217, control of switching between the position indication detection mode and the assigned function execution mode, processing control in the position indication detection mode, processing control in the assigned function execution mode, and the like. The control circuit 218 stores application software (program) for execution of each of the above-described various kinds of control processing in a built-in memory.

The position detection sensor 202 is formed by stacking an X-axis direction loop coil group 202X and a Y-axis direction loop coil group 202Y. Furthermore, the X-axis direction loop coil group 202X and the Y-axis direction loop coil group 202Y of the position detection sensor 202 are connected to the selection circuit 211. The selection circuit 211 sequentially selects one loop coil in the two loop coil groups 202X and 202Y.

The oscillator 212 generates an alternating-current signal with a frequency f0. The oscillator 212 supplies the generated alternating-current signal to the current driver 213 and the writing pressure detecting circuit 217. The current driver 213 converts the alternating-current signal supplied from the oscillator 212 to a current and sends out the current to the switching connection circuit 214.

By control from the control circuit 218, the switching connection circuit 214 switches the connection destination (a transmission-side terminal T or a reception-side terminal R) to which the loop coil selected by the selection circuit 211 is connected. In these connection destinations, the transmission-side terminal T is connected to the current driver 213, and the reception-side terminal R is connected to the reception amplifier 215. Moreover, the switching connection circuit 214 is switched to the side of the terminal T in the case of transmitting a signal from the position detection sensor 202. Conversely, the switching connection circuit 214 is switched to the side of the terminal R in the case of receiving a signal from the external by the position detection sensor 202.

In addition, when the switching connection circuit 214 has been switched to the side of the terminal T, the current from the current driver 213 is supplied to the loop coil selected by the selection circuit 211. Due to this, a magnetic field is generated in this loop coil to allow transmission of a signal (radio waves) for being made to act on the resonant circuit RC of the electronic pen 100 opposed to this loop coil.

On the other hand, when the switching connection circuit 214 has been switched to the side of the terminal R, an induced voltage generated in the loop coil selected by the selection circuit 211 is sent to the reception amplifier 215 through the selection circuit 211 and the switching connection circuit 214. The reception amplifier 215 amplifies the induced voltage supplied from the loop coil and sends out the amplified voltage to the position detecting circuit 216 and the writing pressure detecting circuit 217.

That is, an induced voltage is generated in each loop coil of the X-axis direction loop coil group 202X and the Y-axis direction loop coil group 202Y by radio waves transmitted (returned) from the resonant circuit RC of the electronic pen 100.

The position detecting circuit 216 executes detection of the induced voltage generated in the loop coil, that is, a received signal, regarding the component of the resonant frequency of the resonant circuit RC of the electronic pen 100 and converts a detection output signal thereof to a digital signal Ps to output it to the control circuit 218. Here, the digital signal Ps of the detection output signal from the position detecting circuit 216 corresponds to the received signal level of the signal from the electronic pen 100 received through the position detection sensor 202. In this example, when the received signal level of the received signal from the electronic pen 100 is equal to or lower than the predetermined threshold, interaction of a signal between the position detection sensor 202 and the electronic pen 100 is impossible, and therefore the position detecting circuit 216 outputs a signal whose received signal level is zero as the digital signal Ps of the detection output signal.

Note that this embodiment may be configured as follows. When the received signal level of the received signal from the electronic pen 100 is equal to or lower than the predetermined threshold, the position detecting circuit 216 outputs not the signal whose received signal level is zero but a signal indicating a reception level equal to or lower than the predetermined threshold as the digital signal Ps of the detection output signal. Then, on the basis of the digital signal of the detection output signal of the position detecting circuit 216, the control circuit 218 determines that the received signal level of the received signal from the electronic pen 100 is equal to or lower than the predetermined threshold and interaction of a signal between the position detection sensor 202 and the electronic pen 100 is impossible.

The writing pressure detecting circuit 217 executes synchronous detection of a received signal from the reception amplifier 215 with the alternating-current signal from the oscillator 212, and detects the value of the writing pressure applied to the tip part 105a of the core body 105 of the electronic pen 100 on the basis of the frequency shift (phase difference) between both of the signals to output writing pressure value information Pp to the control circuit 218.

The tablet-type information terminal 200 of this embodiment has the assigned function execution mode in addition to the position indication detection mode as described above. The control circuit 218 executes switching processing between the position indication detection mode and the assigned function execution mode and executes processing control necessary in each mode.

Figure 5:
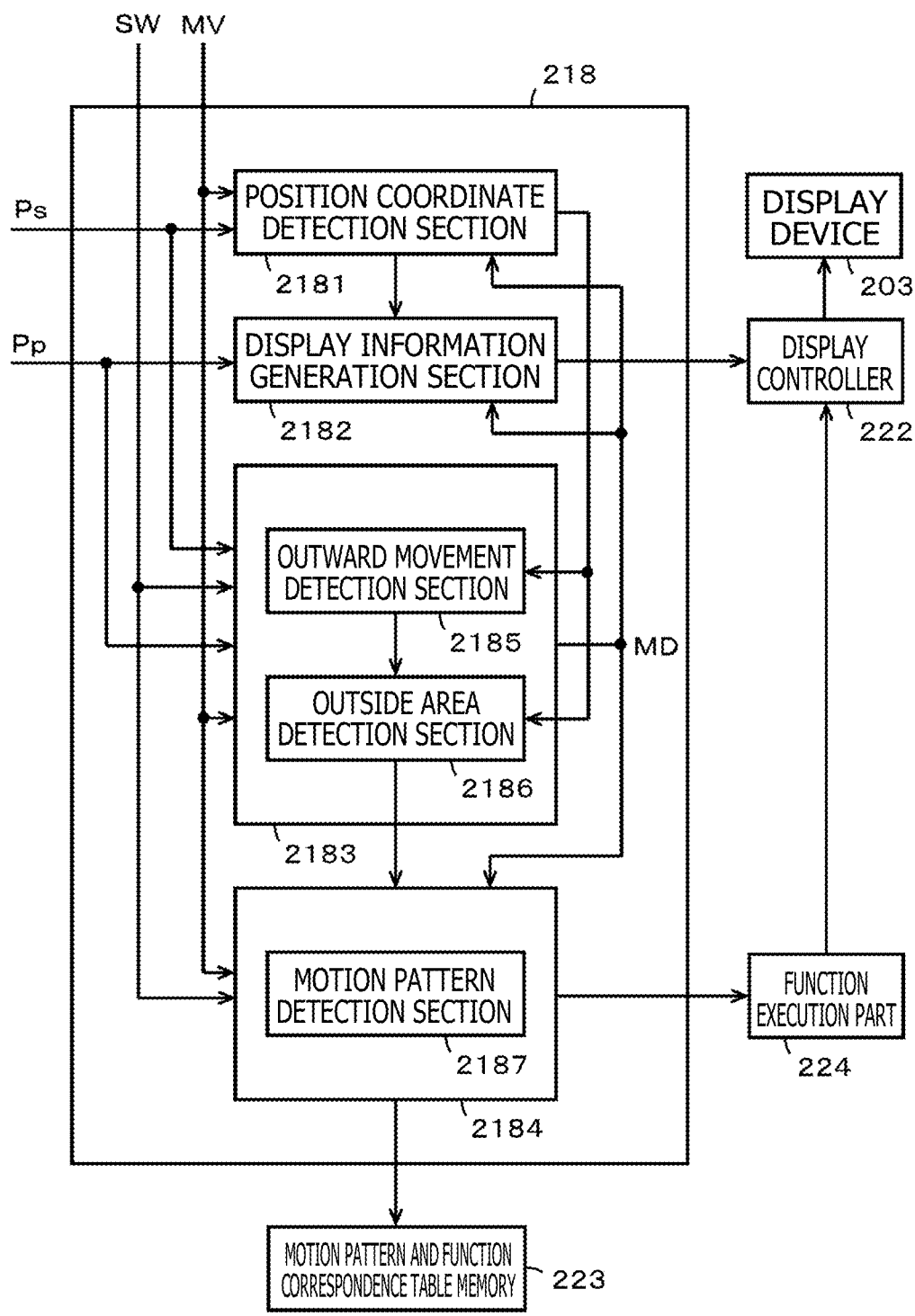
FIG. 5 is a diagram for explaining a functional configuration example of part of the example of the information processing device that configures the embodiment of the information processing system according to this disclosure.

For this purpose, in this embodiment, the control circuit 218 includes processing function sections illustrated in FIG. 5. Specifically, in this embodiment, the control circuit 218 includes a position coordinate detection section 2181, a display information generation section 2182, a mode management control section 2183, and a function recognition section 2184. Furthermore, the mode management control section 2183 includes an outward movement detection section 2185 and an outside area detection section 2186. Moreover, the function recognition section 2184 includes a motion pattern detection section 2187.

The digital signal Ps of the detection output signal from the position detecting circuit 216 is supplied to the position coordinate detection section 2181 and the mode management control section 2183 in the control circuit 218. Furthermore, the writing pressure value information Pp from the writing pressure detecting circuit 217 is supplied to the display information generation section 2182 and, in this example, the mode management control section 2183.

Moreover, as illustrated in FIG. 4, the wireless communication part 219 receives information sent from the wireless communication part 110 of the electronic pen 100 and supplies the received information to the motion detection information acquisition part 220 and the side switch information acquisition part 221. The wireless communication part 219 configures an example of the reception circuit.

The motion detection information acquisition part 220 acquires motion detection information MV of the motion sensor 108 of the electronic pen 100 from the received information and supplies it to the position coordinate detection section 2181, the display information generation section 2182, the mode management control section 2183, and the function recognition section 2184 in the control circuit 218.

Furthermore, the side switch information acquisition part 221 acquires side switch information SW indicating the on/off-state of the side switch 109 of the electronic pen 100 from the received information and supplies it to the mode management control section 2183 and the function recognition section 2184 in the control circuit 218.

In this embodiment, the mode management control section 2183 of the control circuit 218 generates a mode switching signal MD indicating which mode is employed from the non-position indication detection mode, the position indication detection mode, and the assigned function execution mode from the digital signal Ps from the position detecting circuit 216 and the motion detection information MV from the motion detection information acquisition part 220.

Specifically, after the tablet-type information terminal 200 is powered on, the mode management control section 2183 sets the tablet-type information terminal 200 to the state of the non-position indication detection mode until the state of the position indication detection mode is made first. In this non-position indication detection mode, the control circuit 218 does not execute operation based on interaction of a signal with the electronic pen 100.

Moreover, in this non-position indication detection mode, the mode management control section 2183 monitors the digital signal Ps of the detection output signal from the position detecting circuit 216 and discriminates whether or not the received signal level has become equal to or higher than a predetermined threshold level and the state in which interaction of a signal between the position detection sensor 202 and the electronic pen 100 is possible has been made. Furthermore, when discriminating that the state in which interaction of a signal between the position detection sensor 202 and the electronic pen 100 is possible has been made, the mode management control section 2183 supplies the mode switching signal MD that causes a transition from the non-position indication detection mode to the position indication detection mode to the position coordinate detection section 2181, the display information generation section 2182, and the function recognition section 2184.

In this position indication detection mode, the position coordinate detection section 2181 calculates the coordinate values of the X-axis direction and the Y-axis direction regarding the position indicated by the tip part 105a of the core body 105 of the electronic pen 100 on the basis of the digital signal Ps regarding the resonant frequency component from the position detecting circuit 216, that is, each of the levels of the voltage values of induced voltages generated in the respective loop coils, and supplies the coordinate values to the display information generation section 2182.

Moreover, as described above, in this embodiment, in this position indication detection mode, also when the position indicated by the electronic pen 100 has moved to the higher-level outside area Ss outside the hover area without a long press of the operation part 109P for the side switch, the position coordinate detection section 2181 detects also the position coordinates in the higher-level outside area Ss by using the motion detection information from the motion detection information acquisition part 220 and supplies the position coordinates to the display information generation section 2182. The display information generation section 2182 generates display information by using also the position coordinates in this higher-level outside area Ss.

Note that the following configuration may be employed. In the position indication detection mode, also when the position indicated by the electronic pen 100 has moved to not only the higher-level outside area Ss outside the hover area but also other outside areas without a long press of the operation part 109P for the side switch, the position coordinate detection section 2181 detects also the position coordinates in these outside areas by using the motion detection information from the motion detection information acquisition part 220 and supplies the position detection result to the display information generation section 2182 to use the position detection result for processing in the control circuit 218, such as changing the contents of display according to the detected position.

In this position indication detection mode, the display information generation section 2182 generates display information regarding the writing trace of the electronic pen 100, a drawn image, or the like on the basis of the coordinate values of the position indicated by the electronic pen 100, calculated by the position coordinate detection section 2181. Furthermore, the display information generation section 2182 generates the display information in such a manner as to reflect the writing pressure value information from the writing pressure detecting circuit 217 in the thickness of the displayed writing trace, the depth of the drawn image, or the like.

Then, the display information generation section 2182 supplies the generated display image to the display controller 222. The display controller 222 displays the writing trace input by the electronic pen 100 or the drawn image on the display screen 203D of the display device 203 on the basis of the received display information.

In this position indication detection mode, the function recognition section 2184 monitors the side switch information from the side switch information acquisition part 221 and generates information based on the side switch information to output it to the function execution part 224. The function execution part 224 executes function processing according to the information from the function recognition section, in this case, for example, processing similar to a click of a mouse according to on/off-operation of the side switch 109. Then, the function execution part 224 generates display information corresponding to the executed processing function and supplies the generated display information to the display controller 222. The display controller 222 causes the display screen of the display device 203 to display an image based on the display information.

The function execution part 224 is configured to execute not only the above-described processing function according to on/off-operation of the side switch 109 but also, in this embodiment, various functions of processing for still image shooting or moving image shooting using the camera 207, sound reproduction processing through the speaker 206, display processing of a shot image, memorandum function processing, picture drawing function processing, and the like.

Moreover, in this embodiment, in this position indication detection mode, the mode management control section 2183 determines that a transmission has been made from the position indication detection mode to the non-position indication detection mode when discriminating that the received signal level indicated by the digital signal Ps of the detection output signal from the position detecting circuit 216 has become equal to or lower than the predetermined threshold and interaction of a signal between the position detection sensor 202 and the electronic pen 100 has become an impossible state without long press operation of the operation part 109P for the side switch.

However, the mode management control section 2183 keeps the position indication detection mode when the period during which the received signal level indicated by the digital signal Ps of the detection output signal from the position detecting circuit 216 is equal to or lower than the predetermined threshold is a predetermined slight time T1.

Furthermore, when the period during which the received signal level indicated by the digital signal Ps of the detection output signal from the position detecting circuit 216 is equal to or lower than the predetermined threshold has become equal to or longer than the above-described time T1, the mode management control section 2183 determines that the electronic pen 100 has moved to the outside area of the position detection area of the position detection sensor 202, and determines that a transition has been made from the position indication detection mode to the non-position indication detection mode. Then, on the basis of this determination, the mode management control section 2183 supplies the mode switching signal MD that causes a transition from the position indication detection mode to the non-position indication detection mode to the position coordinate detection section 2181, the display information generation section 2182, and the function recognition section 2184.

Moreover, in this embodiment, the mode management control section 2183 discriminates, by the outward movement detection section 2185, whether or not operation to move the electronic pen 100 from the inside of the position detection area of the position detection sensor to the outside area thereof has been executed with long press operation of the operation part 109P for the side switch in the position indication detection mode, to detect whether or not the electronic pen 100 has moved from the inside of the position detection area of the position detection sensor 202 to the outside area.

In this case, the outward movement detection section 2185 may use either method of the first method and the second method as the method of the above-described "Detection of Movement from Inside of Position Detection Area of Position Detection Sensor to Outside Area." In addition, the detection may be surely executed by executing the first method and the second method in combination.

Furthermore, in the case of detecting that the electronic pen 100 has moved from the inside of the position detection area of the position detection sensor 202 to the outside area, the outward movement detection section 2185 may use, in combination, also the fact that the writing pressure value information from the electronic pen 100 has become the state in which the writing pressure value is zero.

When the movement of the electronic pen 100 to the outside area is detected by this outward movement detection section 2185, the mode management control section 2183 determines that a transition has been made from the position indication detection mode to the assigned function execution mode, and supplies the mode switching signal MD that causes a transition from the position indication detection mode to the assigned function execution mode to the position coordinate detection section 2181, the display information generation section 2182, and the function recognition section 2184.

Moreover, in the mode management control section 2183, when movement to the area outside the position detection area of the position detection sensor is detected by this outward movement detection section 2185, which outside area in the above-described five outside areas the electronic pen 100 has moved to is detected by the outside area detection section 2186.

In this case, the outside area detection section 2186 may use either method of the first method and the second method as the method of the above-described "Detection of Which of a Plurality of Outside Areas Electronic Pen Has Moved to."

The outside area detection section 2186 of the mode management control section 2183 supplies information regarding which outside area the detected outside area is to the function recognition section 2184. Furthermore, in this assigned function execution mode, the outside area detection section 2186 monitors whether the electronic pen 100 has moved to any other outside area without return to the inside of the position detection area of the position detection sensor.

Specifically, in the assigned function execution mode, the position coordinate detection section 2181 calculates the position coordinates in all outside areas of the position detection area of the position detection sensor 202 from the position coordinates in the position detection area immediately before shift to the outside area and the movement amount (Δx, Δy, Δz) calculated from the motion detection information as described above, and supplies information on the calculated position coordinates in the outside areas to the outside area detection section 2186 of the mode management control section 2183.

In this assigned function execution mode, the outside area detection section 2186 monitors the information on the position coordinates of the electronic pen 100 in the outside area from the position coordinate detection section 2181. When the outside area in which the electronic pen 100 is located has changed, the outside area detection section 2186 supplies information on the outside area to the function recognition section 2184.

Note that the outside area detection section 2186 is provided with information (map information) to identify the area ranges of the above-described five outside areas on the basis of area information of the position detection area of the position detection sensor 202 in order to sense which outside area the electronic pen 100 is located in from the information on the position coordinates of the electronic pen 100 in the outside area. Note that the configuration may be made in such a manner that, without this map information, which outside area the position at which the electronic pen 100 exists is included in is calculated every time from the information on the position of the electronic pen 100 in the outside area.

In the tablet-type information terminal 200 of this embodiment, several motion patterns of the electronic pen 100 for specifying (calling) the function that the user of the electronic pen 100 attempts to execute are defined in advance, and the function recognition section 2184 includes the motion pattern detection section 2187 for detecting these motion patterns.

The motion pattern detection section 2187 monitors the motion detection information from the motion detection information acquisition part 220 and detects the motion pattern defined in advance as the motion pattern of the electronic pen 100. In this example, as the motion pattern of the electronic pen 100, a "turn" motion pattern in which the pen tip of the electronic pen 100 is rotated to draw a circle one to multiple times and a "shake" motion pattern in which the pen tip of the electronic pen 100 is linearly reciprocated in a given direction are defined in advance.

Moreover, in the information processing system of this embodiment, regarding each of the above-described "turn" and "shake" patterns, functions different for each of the above-described five outside areas are assigned. In the motion pattern and function correspondence table memory 223, information on a correspondence table of each of the "turn" motion pattern and the "shake" motion pattern and the different functions associated in each of the five outside areas is stored. FIG. 6 illustrates an example of motion pattern and function correspondence table information stored in the motion pattern and function correspondence table memory 223.

Specifically, in this embodiment, as illustrated in FIG. 6, the "turn" motion pattern and the "shake" motion pattern are assigned to "music play" and "music stop (play stop)" in the upside outside area Us, "Internet connection" and "album play" in the downside outside area Ds, "return (return to previous processing)" and "forward (forward to subsequent processing)" in the left outside area Ls, "photograph (still image shooting)" and "moving image (shooting)" in the right outside area Rs, and "memorandum (function)" and "picture drawing (function)" in the higher-level outside area Ss.

That is, in this embodiment, with respect to the two kinds of motion patterns, the "turn" motion pattern and the "shake" motion pattern, the assigned functions are made different for each of the five outside areas. This makes it possible to specify ten functions by the two kinds of motion patterns.

In the assigned function execution mode, the motion pattern detection section 2187 of the function recognition section 2184 recognizes the assigned function associated with the detected motion pattern of the electronic pen 100 and information on the outside area detected by the outside area detection section 2186 of the mode management control section 2183 by referring to the motion pattern and function correspondence table memory 223, and supplies information on the recognized assigned function to the function execution part 224.

The function execution part 224 grasps the function specified by the user by the information on the assigned function from the function recognition section 2184 and executes the function. Then, the function execution part 224 generates display information according to the executed function and supplies the generated display information to the display controller 222 to display it on the display screen of the display device 203.

The flow of the processing operation in the control circuit 218 described above will be described with respect to FIG. 7 and FIG. 8 as a sequel to FIG. 7. Note that, in the explanation of FIG. 7 and FIG. 8, description will be made about the case in which the control circuit 218 executes processing of each act by executing a software program for each of the respective functional sections illustrated in FIG. 5. That is, the control circuit 218 includes a processor and a memory storing instructions that, when executed by the processor, cause the processor to perform the functions of the position coordinate detection section 2181, the display information generation section 2182, the mode management control section 2183, the function recognition section 2184, the outward movement detection section 2185, the outside area detection section 2186, and the motion pattern detection section 2187 described herein.

Figure 7:
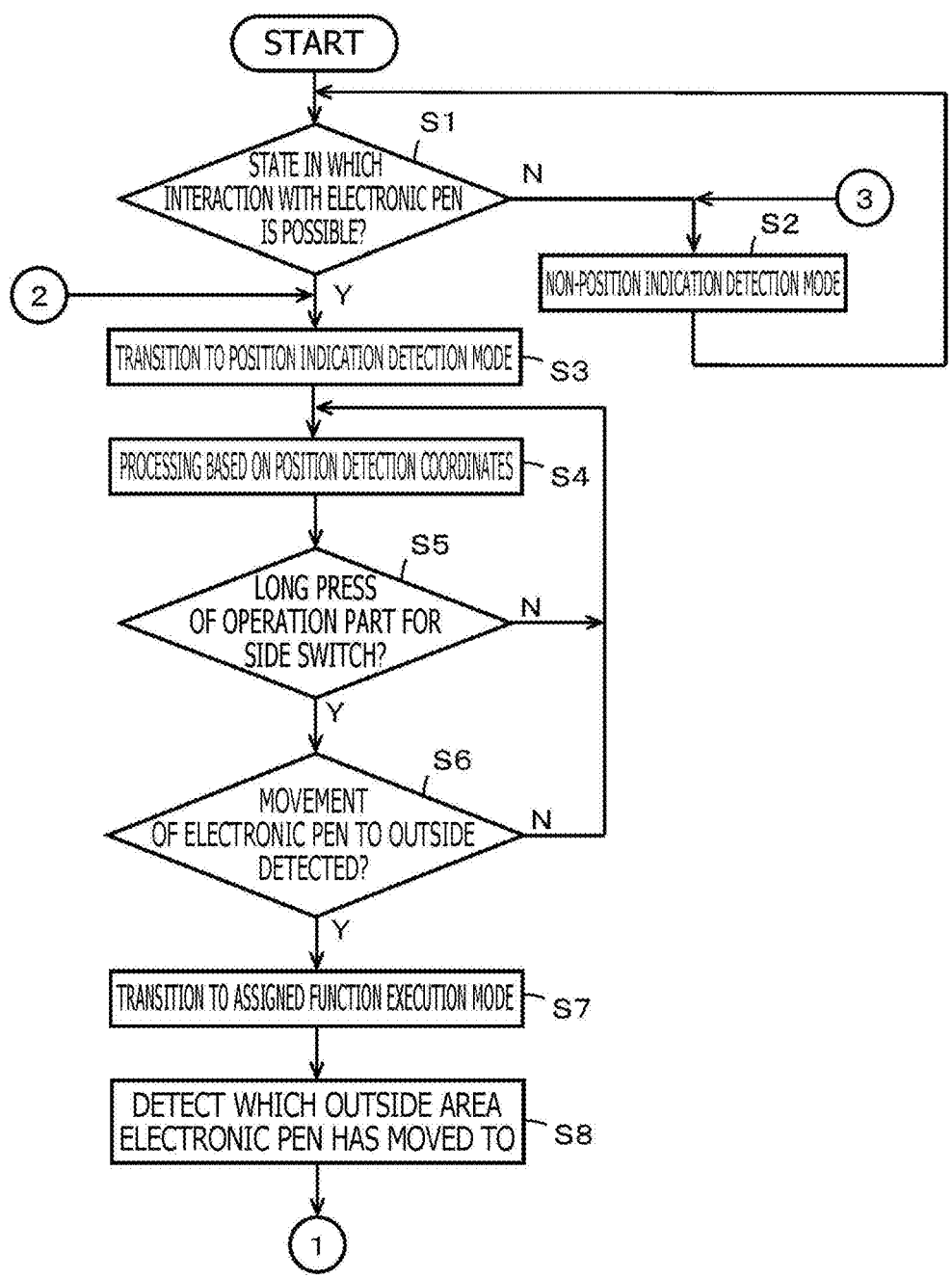
FIG. 7 is a diagram illustrating part of a flowchart for explaining operation of the example of the information processing device that configures the embodiment of the information processing system according to this disclosure.

As illustrated in FIG. 7, when the tablet-type information terminal 200 is powered on, the control circuit 218 starts the processing from "START" in FIG. 7 and discriminates whether or not the state in which interaction of a signal between the electronic pen 100 and the position detection sensor 202 is possible has been made (S1). When discriminating in S1 that the state in which interaction of a signal between the electronic pen 100 and the position detection sensor 202 is possible has not been made, the control circuit 218 sets the tablet-type information terminal 200 to the state of the non-position indication detection mode and sets, for example, the position detecting circuit 216 and the writing pressure detecting circuit 217 to the non-operating state (S2), to return the processing to S1.

When discriminating in S1 that the state in which interaction of a signal between the electronic pen 100 and the position detection sensor 202 is possible has been made, the control circuit 218 sets the tablet-type information terminal 200 to the state of the position indication detection mode (S3) and executes display processing and so forth based on the detection coordinates of the position indicated by the electronic pen 100 (S4).

Next, the control circuit 218 discriminates whether or not long press of the operation part 109P for the side switch has been detected (S5). When discriminating that long press of the operation part 109P for the side switch has not been detected, the control circuit 218 returns the processing to S4 and repeats the processing of S4 and the subsequent processing.

Then, when discriminating in S5 that long press of the operation part 109P for the side switch has been detected, the control circuit 218 discriminates whether or not the movement of the electronic pen 100 from the inside of the position detection area of the position detection sensor to the outside thereof has been detected (S6). When discriminating in S6 that the electronic pen 100 has not been moved from the inside of the position detection area of the position detection sensor to the outside thereof, the control circuit 218 returns the processing to the S4 and repeats the processing of S4 and the subsequent processing.

Furthermore, when discriminating in S6 that the electronic pen 100 has been moved from the inside of the position detection area of the position detection sensor to the outside thereof, the control circuit 218 makes a transition of the tablet-type information terminal 200 from the position indication detection mode to the assigned function execution mode (S7). Then, the control circuit 218 detects which outside area the electronic pen 100 has been moved to (S8).

Figure 8:
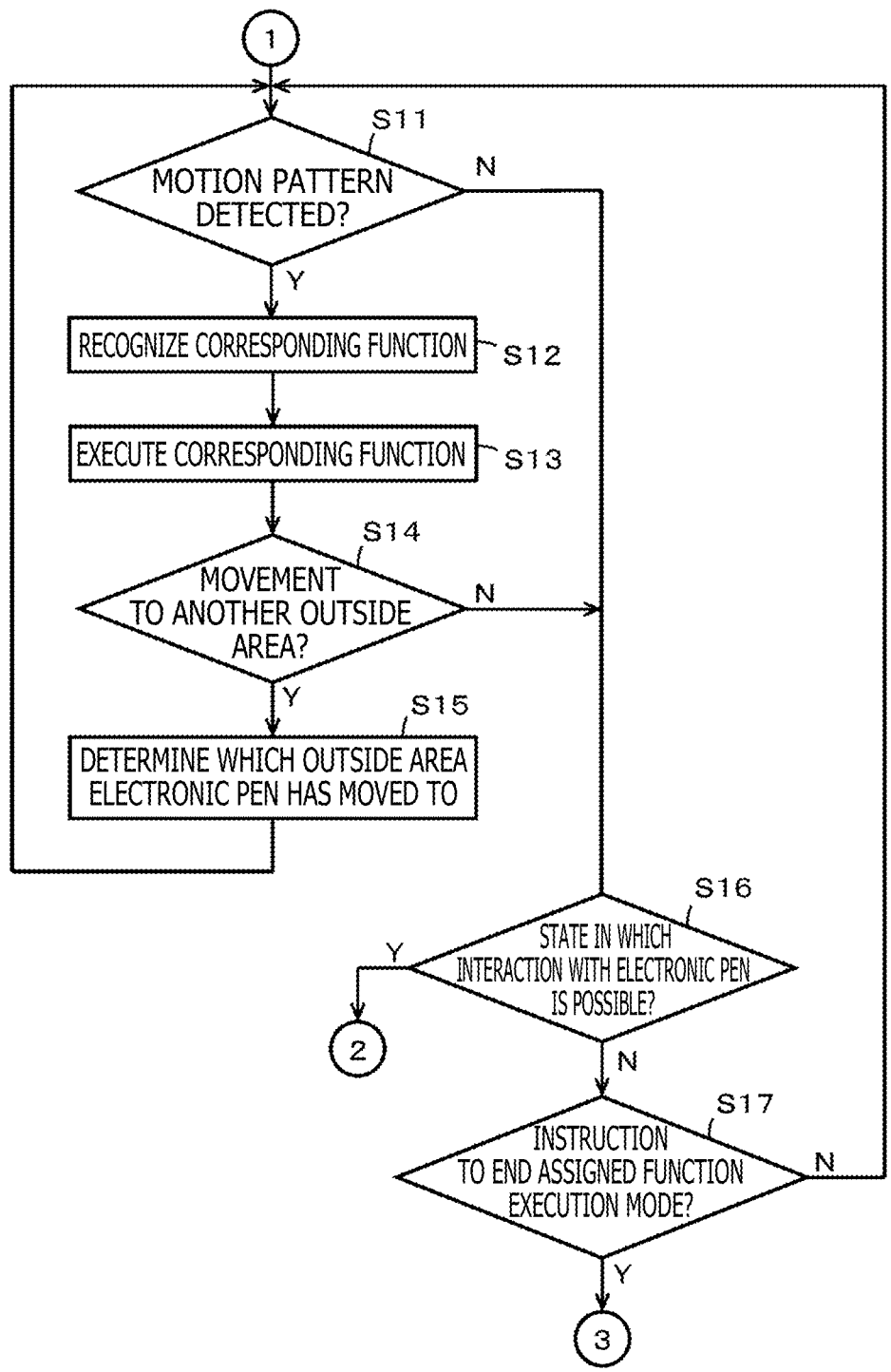
FIG. 8 is a diagram illustrating part of the flowchart for explaining the operation of the example of the information processing device that configures the embodiment of the information processing system according to this disclosure.

Next, the control circuit 218 discriminates whether or not the motion pattern of the electronic pen 100 set in advance has been detected on the basis of the motion detection information of the motion sensor 108 of the electronic pen 100 received through the wireless communication part 219 (S11 in FIG. 8).

When discriminating in S11 that the motion pattern of the electronic pen 100 set in advance has been detected, the control circuit 218 recognizes the function associated with and assigned to the detected motion pattern and the outside area detected in S8 by referring to the motion pattern and function correspondence table memory 223 (S12). Then, the control circuit 218 supplies information on the recognized function to the function execution part 224 and causes the function execution part 224 to execute the function.

Next, the control circuit 218 discriminates whether or not the electronic pen 100 has moved to another outside area on the basis of information on the position of the electronic pen 100 in the outside area using the motion detection information (S14). When discriminating in S14 that the electronic pen 100 has moved to another outside area, the control circuit 218 determines which outside area the electronic pen 100 has moved to (S15), and returns the processing to the S11 to repeat the processing of S11 and the subsequent processing.

Then, when discriminating in S11 that the motion pattern of the electronic pen 100 set in advance has not been detected or when discriminating in S14 that the electronic pen 100 has not moved to another outside area, the control circuit 218 discriminates whether or not the state in which interaction of a signal between the electronic pen 100 and the position detection sensor 202 is possible has been made (S16).

When discriminating in S16 that the state in which interaction of a signal between the electronic pen 100 and the position detection sensor 202 is possible has not been made, the control circuit 218 discriminates whether or not an instruction to end the assigned function execution mode has been made (S17). In this example, as this instruction to end the assigned function execution mode, long press operation of the operation part 109P for the side switch in the electronic pen 100 existing in the outside area is employed, for example. Note that, instead of long press of the operation part 109P for the side switch in the electronic pen 100, predetermined button operation of the tablet-type information terminal 200 may be employed as the instruction to end the assigned function execution mode.

When discriminating in the S17 that the instruction to end the assigned function execution mode has not been made, the control circuit 218 returns the processing to S11 and repeats the processing of S11 and the subsequent processing. Moreover, when discriminating in S17 that the instruction to end the assigned function execution mode has been made, the control circuit 218 returns the processing to the S2 in FIG. 7 and repeats the processing of S2 and the subsequent processing.

Effects of Information Processing System of Embodiment

According to the information processing system of the above-described embodiment, the user can cause the function assigned corresponding to the predetermined motion pattern to be executed by the tablet-type information terminal 200 by only executing operation to move the electronic pen 100 to the outside of the position detection area of the position detection sensor 202 and making the predetermined motion pattern by the electronic pen 100 in the outside of the position detection area.

Furthermore, in the information processing system of the above-described embodiment, a plurality of outside areas are set outside the position detection area of the position detection sensor 202. In addition, the configuration is made in such a manner that a different function is assigned with respect to the same motion pattern of the electronic pen 100 for each of the plurality of outside areas. Therefore, even with a small number of kinds of motion patterns of the electronic pen 100, functions in a number that is several times the number of outside areas can be assigned and executed. Moreover, in the information processing system of the above-described embodiment, the tablet-type information terminal 200 can acquire the position of the electronic pen 100 not only in the inside of the position detection area of the position detection sensor 202 but also in the outside thereof by acquiring (receiving) the motion detection information of the motion sensor 108 disposed in the electronic pen 100.

Thus, the configuration can be made in such a manner that, also in the position indication detection mode, the position of the electronic pen 100 can be monitored even in the outside area of the position detection area of the position detection sensor 202. When such a configuration is made, the tablet-type information terminal 200 can always monitor the motion of the electronic pen 100 and determine also the behavior of the electronic pen 100, such as whether the user has always held the electronic pen 100, whether the user has stopped motion while holding the electronic pen 100, whether the user has continued to move the electronic pen 100 although not making a writing input or drawing input with the electronic pen 100, or whether the user has placed the electronic pen 100 at a position other than positions in the input surface of the tablet-type information terminal 200.

Other Embodiments and Modification Examples of Information Processing System

Note that, in the above-described embodiment, in order to allow ensured detection of the start operation for starting the assigned function execution mode, the user moves the electronic pen 100 to the outside of the position detection area while executing a long press of the operation part 109P for the side switch. However, to allow ensured detection of the start operation for starting the assigned function execution mode, the movement of the electronic pen 100 may be accompanied by not operation on the side of the electronic pen 100 but operation on the side of the tablet-type information terminal 200. For example, one of the operation buttons 208 of the tablet-type information terminal 200 may be employed as a button for starting the assigned function execution mode, and operation to move the electronic pen 100 to the outside of the position detection area with pressing-down of this button or operation to move the electronic pen 100 to the outside of the position detection area after pressing-down of this button may be employed as operation to start the assigned function execution mode. Also in this case, the press-down operation of the operation button 208 is not indispensable and merely the electronic pen 100 may be moved to the outside of the position detection area similarly to the case of the above-described operation of the operation part 109P for the side switch.

Furthermore, in the information processing system of the above-described embodiment, functions each executed by different application software are employed as the functions assigned to the outside areas of the position detection area of the position detection sensor. However, it is obvious that the assigned functions are not limited to such functions and may be, for example, functions accessorily executed by subroutines or the like in one piece of application software. For example, it is also possible to employ the following configuration. When drawing according to the position indication input in the position detection area of the position detection sensor 202 is being executed with the electronic pen 100 with a drawing application using the position indicated by the electronic pen 100, a function of changing an attribute of rendering, for example, the depth of a color, is activated or a function of enlarging or reducing a drawn image on the display screen is activated, by moving the electronic pen 100 to the outside area and causing the electronic pen 100 to make a predetermined motion pattern.

Moreover, although the electronic pen is used as the position indicator in the information processing system of the above-described embodiment, the position indicator is not limited to the electronic pen and may be any type of indicator as long as it has a function of executing position indication to the position detection sensor.

For example, FIGS. 9A and 9B illustrate an example of the case in which an information processing system is configured as a game device 300. The game device 300 of this example is an example applied to a game machine called Nintendo Switch made by Nintendo Co., Ltd. As illustrated in FIG. 9A, the game device 300 is configured to include a game console 301 as an example of an information processing device and two game controllers 302R and 303L attachable and detachable to and from this game console 301.

The game console 301 is what executes a game application. In this embodiment, the game console 301 includes a position detection sensor 202A and has functions similar to those of the above-described tablet-type information terminal 200.

Furthermore, the game controllers 302R and 303L are configured in such a manner that, as illustrated in FIG. 9B, they can be detached from the game console 301 and be used and, at the time of the detachment, position indication adapters 100R and 100L having a position indication function can be mounted thereon. Therefore, the game controllers 302R and 303L on which the position indication adapters 100R and 100L are mounted each configure a position indicator.

The position indication adapters 100R and 100L have functions similar to those of the above-described electronic pen 100 and are capable of interaction of a signal with the position detection sensor 202A of the game console 301. In addition, they include motion sensors (illustration is omitted) and operation parts 109PR and 109PL for the side switch. Moreover, in this example, the position indication adapters 100R and 100L are configured to include memory parts (illustration is omitted) that store identification information IDR and IDL for identification of the respective adapters and send not only the motion detection information and the side switch information but also the identification information IDR and IDL to the game console 301 through wireless communication parts (illustration is omitted).

Furthermore, in the game device of the example of FIGS. 9A and 9B, the game controllers 302R and 303L are used as ones for the respective players in a game application of match-up between two persons regarding, for example, tennis, table tennis, or badminton.

Moreover, when, as illustrated by thick solid arrows in FIG. 9B, the respective players have executed operation to move the game controller 302R from the inside of the position detection area of the position detection sensor 202A to the right outside area Rs and have executed operation to move the game controller 303L from the inside of the position detection area of the position detection sensor 202A to the left outside area Ls, the game console 301 displays a court of the match-up game on the display screen, with the court divided in the left-right direction. In addition, the game console 301 recognizes the game controller 302R as one for the player on the right court and recognizes the game controller 303L as one for the player on the left court, and causes execution of the match-up game.

Furthermore, in this example, when a predetermined motion pattern is made by the game controller 302R or 303L (position indication adapter 100R or 100L) in the right outside area Rs and the left outside area Ls, a function according to the motion pattern is executed in the game console 301. In this case, in the right outside area Rs and the left outside area Ls, the same function may be assigned as the function corresponding to the motion pattern or different functions may be assigned.

Moreover, when it is detected that, as illustrated by dotted arrows in FIG. 9B, the game controller 302R has been moved from the right outside area Rs to the left outside area Ls and the game controller 303L has been moved from the left outside area Ls to the right outside area Rs, it is deemed that a court change has been made. The game console 301 recognizes the game controller 302R as one for the player on the left court and recognizes the game controller 303L as one for the player on the right court, and causes execution of the match-up game.

Furthermore, when the respective players have executed operation to move the game controller 302R from the inside of the position detection area of the position detection sensor 202A to the upside outside area Us and have executed operation to move the game controller 303L from the inside of the position detection area of the position detection sensor 202A to the downside outside area Ds, the game console 301 displays a court of the match-up game on the display screen, with the court divided in the up-down direction. In addition, the game console 301 recognizes the game controller 302R as one for the player on the upside court and recognizes the game controller 303L as one for the player on the downside court, and causes execution of the match-up game.

Then, when a predetermined motion pattern is made by the game controller 302R or 303L (position indication adapter 100R or 100L) in the upside outside area Us and the downside outside area Ds, a function according to the motion pattern is executed in the game console 301. In this case, in the upside outside area Us and the downside outside area Ds, the same function may be assigned as the function corresponding to the motion pattern or different functions may be assigned. Note that, although the position indicators and the position detection sensors in the information processing systems of the above embodiments are ones of the electromagnetic induction coupling system, they are not limited thereto and may be ones of the capacitive coupling system, for example.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An information processing system comprising:
 a position indicator; and
 an information processing device including a position detection sensor,
 wherein the position indicator includes:
  a first transmission circuit that, in operation, transmits a signal to the position detection sensor of the information processing device;
  a motion sensor that, in operation, outputs motion detection information of the position indicator; and
  a second transmission circuit that, in operation, transmits the motion detection information of the position indicator to the information processing device; and
 wherein the information processing device includes:
  a position detector that, in operation, detects a position of the position indicator in a position detection area of the position detection sensor based on the signal transmitted by the first transmission circuit of the position indicator,
  a reception circuit that, in operation, receives the motion detection information of the position indicator from the second transmission circuit of the position indicator;
  a processor; and
  a memory storing instructions that, when executed by the processor, cause the information processing device to:
   detect that the position indicator has moved from inside of the position detection area of the position detection sensor to outside of the position detection area;
   detect a motion pattern of the position indicator from the motion detection information received by the reception circuit based on detection of movement of the position indicator to outside of the position detection area;
   recognize a function of the information processing device assigned to the motion pattern of the position indicator; and
   perform the function.

2. The information processing system according to claim 1, wherein
 the position detection area of the position detection sensor includes a surface area of an input surface of the position detection sensor and a spatial area above the surface area of the input surface and in which interaction with the position indicator is possible, and outside of the position detection area includes an area around the surface area of the input surface and a space that is above the surface area of the input surface and in which interaction with the position indicator is impossible.

3. The information processing system according to claim 1, wherein
 the instructions, when executed by the processor, cause the information processing device to detect a movement direction in which the position indicator moves from inside of the position detection area of the position detection sensor to outside of the position detection area, and
 the function of the information processing device assigned to the motion pattern of the position indicator is associated with the movement direction.

4. The information processing system according to claim 3, wherein the instructions, when executed by the processor, cause the information processing device to:
 detect the movement direction based on a temporal change in the position of the position indicator detected by the position detector.

5. The information processing system according to claim 3, wherein the instructions, when executed by the processor, cause the information processing device to:

detect the movement direction based on the motion detection information received by the reception circuit.

6. The information processing system according to claim 1, wherein the instructions, when executed by the processor, cause the information processing device to:
   detect that the position indicator has moved from inside of the position detection area of the position detection sensor to outside of the position detection area based on an occurrence of a state in which the position detector is incapable of detection of the position of the position indicator based on the signal transmitted by the first transmission circuit of the position indicator.

7. The information processing system according to claim 1, wherein the instructions, when executed by the processor, cause the information processing device to:
   in response to detecting that the position indicator has moved from inside of the position detection area of the position detection sensor to outside of the position detection area, detect a position of the position indicator outside of the position detection area based on information on the position of the position indicator immediately before detecting that the position indicator has moved from inside of the position detection area of the position detection sensor to outside of the position detection area and the motion detection information of the position indicator received by the reception circuit.

8. The information processing system according to claim 1, wherein
   a plurality of outside areas outside of the position detection area is assigned;
   the outside areas do not overlap with each other;
   the function of the information processing device assigned to the motion pattern of the position indicator is assigned to one of the outside areas; and
   the instructions, when executed by the processor, cause the information processing device to:
      detect that the position indicator has moved to the one of the outside areas; and
      recognize the function of the information processing device assigned to the motion pattern of the position indicator and assigned to the one of the outside areas detected.

9. The information processing system according to claim 8, wherein
   each of the plurality of outside areas is in contact with the position detection area of the position detection sensor in a respective one of a plurality of position ranges different from each other in the position detection area, and
   the instructions, when executed by the processor, cause the information processing device to detect the one of the outside areas to which the position indicator has moved based on detecting a position of the position indicator in one of the position ranges of the position detection area that is in contact with the one of the plurality of outside areas immediately before occurrence of a state in which the position detector is incapable of detection of the position of the position indicator based on the signal transmitted by the first transmission circuit of the position indicator.

10. The information processing system according to claim 9, wherein
    the position detection area of the position detection sensor has a polygonal shape or a polyhedral shape;
    each of the plurality of outside areas is in contact with the position detection area in one of the position ranges including a respective one of a plurality of sides of the polygonal shape or a respective one of a plurality of planes of the polyhedral shape in the position detection area; and
    the instructions, when executed by the processor, cause the information processing device to detect the one of the plurality of outside areas to which the position indicator has moved based on detecting a position of the position indicator in one of the position ranges immediately before occurrence of the state in which the position detector is incapable of detection of the position of the position indicator based on the signal transmitted by the first transmission circuit of the position indicator.

11. The information processing system according to claim 8, wherein the instructions, when executed by the processor, cause the information processing device to:
    the motion pattern detected includes a plurality of motion patterns, and functions of the information processing device assigned to the motion patterns are different for each of the outside areas.

12. The information processing system according to claim 8, wherein the instructions, when executed by the processor, cause the information processing device to:
    in response to detecting that the position indicator has moved from inside of the position detection area of the position detection sensor to outside of the position detection area, the position detector detects a position of the position indicator outside of the position detection area based on information regarding a position of the position indicator immediately before detecting that the position indicator has moved from inside of the position detection area of the position detection sensor to outside of the position detection area and the motion detection information of the position indicator received by the reception circuit, and
    a position of the position indicator in an area outside of the position detection area is detected by the position detector is monitored and, when the position indicator has moved to another one of the outside areas, a movement to the other one of the outside areas is transmitted.

13. The information processing system according to claim 1, wherein the instructions, when executed by the processor, cause the information processing device to:
    control whether or not detection of movement of the position indicator from inside of the position detection area of the position detection sensor to outside of the position detection area and detection of the motion pattern of the position indicator is performed based on a predetermined operation input by a user.

14. The information processing system according to claim 1, wherein
    the position indicator includes a switch that, in operation, is turned on and off by a user operation, and includes a circuit that, in operation, transmits operation information regarding turning on and off of the switch to the information processing device; and
    the instructions, when executed by the processor, cause the information processing device to control whether or not detection of movement of the position indicator from inside of the position detection area of the position detection sensor to outside of the position detection area and detection of the motion pattern of the position indicator is performed based on the operation information regarding turning on and off of the switch received from the position indicator.

15. The information processing system according to claim 13, wherein
- the position detection area of the position detection sensor includes a spatial area that is above a surface area of an input surface of the position detection sensor and in which interaction with the position indicator is possible; and
- when detection of movement of the position indicator from inside of the position detection area of the position detection sensor to outside of the position detection area and detection of the motion pattern of the position indicator are not performed, the instructions, when executed by the processor, cause the information processing device to:
  - detect, by the position detector, a spatial position of the position indicator based on a position detection result obtained when the position of the position indicator is in the spatial area in which the interaction with the position indicator is possible and the motion detection information received by the reception circuit after the position indicator has entered the spatial area in which the interaction with the position indicator is possible in a space that is outside the position detection area and is above the surface area of the input surface and in which the interaction with the position indicator is impossible, and
  - perform processing according to the spatial position of the position indicator.

16. The information processing system according to claim 1, wherein
- the information processing device includes a display device with a display screen area that overlaps the position detection area of the position detection sensor.

17. The information processing system according to claim 1, wherein
- the position indicator includes a plurality of position indicators, and each of the position indicators, in operation, transmits identification information to the information processing device, and
- the instructions, when executed by the processor, cause the information processing device to perform processing corresponding to pieces of information simultaneously received from the plurality of position indicators by recognizing each of the position indicators based on of the identification information transmitted by each of the position indicators.

18. The information processing system according to claim 1, wherein
- the position indicator and the position detection sensor interact by an electromagnetic induction system.

19. The information processing system according to claim 1, wherein
- the position indicator and the position detection sensor interact by a capacitive system.

* * * * *